United States Patent
Cho et al.

(10) Patent No.: US 10,642,017 B2
(45) Date of Patent: May 5, 2020

(54) IMAGING SYSTEM AND IMAGING METHOD

(71) Applicant: MITUTOYO CORPORATION, Kanagawa (JP)

(72) Inventors: Gyokubu Cho, Kanagawa (JP); Tatsuya Nagahama, Kanagawa (JP); Takahisa Ootake, Kanagawa (JP); Kazuki Kitagawa, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 430 days.

(21) Appl. No.: 15/455,934

(22) Filed: Mar. 10, 2017

(65) Prior Publication Data

US 2017/0285318 A1 Oct. 5, 2017

(30) Foreign Application Priority Data

Apr. 1, 2016 (JP) ................................ 2016-074566

(51) Int. Cl.
*G02B 21/24* (2006.01)
*G02B 21/02* (2006.01)
*G02B 21/36* (2006.01)

(52) U.S. Cl.
CPC ......... *G02B 21/245* (2013.01); *G02B 21/025* (2013.01); *G02B 21/361* (2013.01); *G02B 21/365* (2013.01)

(58) Field of Classification Search
CPC .. G02B 21/245; G02B 21/025; G02B 21/361; G02B 21/365
USPC .......................................................... 348/79
See application file for complete search history.

(56) References Cited

U.S. PATENT DOCUMENTS

| | | | | |
|---|---|---|---|---|
| 2007/0146873 A1* | 6/2007 | Ortyn | ................. | G02B 27/0075 359/386 |
| 2007/0211241 A1* | 9/2007 | Aizawa | ................. | G01N 21/94 356/237.2 |
| 2007/0247640 A1* | 10/2007 | Magome | ............... | G03F 9/7003 356/609 |
| 2009/0002812 A1* | 1/2009 | Kuster | ................. | G02B 21/025 359/385 |
| 2012/0312957 A1* | 12/2012 | Loney | ................. | G02B 21/245 250/201.3 |
| 2015/0145980 A1 | 5/2015 | Bryll | | |
| 2015/0346475 A1 | 12/2015 | Moriuchi et al. | | |

FOREIGN PATENT DOCUMENTS

JP 2015-104136 A 6/2015

* cited by examiner

*Primary Examiner* — Matthew K Kwan
(74) *Attorney, Agent, or Firm* — Greenblum & Bernstein, P.L.C.

(57) ABSTRACT

An imaging system includes: an image forming device that obtains image information of an object with the focal length to the object being changed by a variable focal length lens in an optical system, so as to form an all-focused image of the object; a sensor device that detects variations in the surface level of the object in a focus direction; and a position adjustment device that adjusts the position of the object in the focus direction in accordance with the surface level variations of the object detected by the sensor device. The position adjustment device adjusts the position of the object in the focus direction in such a manner that the surface level of the object becomes closer to the center of a variable focal length range of the variable focal length lens.

16 Claims, 6 Drawing Sheets

IMAGING SYSTEM AND IMAGING METHOD

CROSS-REFERENCES TO RELATED APPLICATIONS

This application relates to and claims priority from Japanese Patent Application No. JP2016-074566, filed on Apr. 1, 2016, the entire disclosure of which is incorporated herein by reference.

BACKGROUND

Field

The present invention relates to imaging systems and imaging methods.

Description of Related Art

In conventional scanning-type imaging systems used as imaging systems for microscopes, image measurement apparatuses, inspection apparatuses, laser processing apparatuses and the like, a plurality of images is taken through scanning with an optical system in the Z-direction (the direction of focus), and in-focus portions of the obtained images are combined to generate an image (all-focused image) which is in focus in the entire field of view.

Such scanning type imaging systems are, however, unable to move the optical system in the X-Y direction (i.e. the direction perpendicular to the Z-direction) until a necessary number of images are taken through scanning with the optical system in the Z-direction. For this reason, it may take a considerable time to form an image of a target object as a whole.

Under these circumstances, non-scanning type imaging systems have recently been presented (see JP2015-104136 A), such systems including an optical system equipped with a variable focal length lens which is capable of changing the focal length, and generating an all-focused image of an object by obtaining image information on the object while changing the focal length to the object. Unlike scanning type imaging systems, non-scanning type imaging systems as described above do not need to move the optical system mechanically in the Z-direction, but, rather, are able to instantly obtain images with different focal lengths, so that the imaging range can be moved in the X-Y direction while obtaining all-focused images for each field of view. As a result, the entire object can be imaged in a short time.

SUMMARY

In such non-scanning type imaging systems, however, the variable focal length range (extended depth of field) of the variable focal length lens has a certain limitation depending on the magnification of observation, the size of the system, etc. As a result, if an object has large undulations or bumps, etc., on the surface thereof, in some cases, the variable focal length range of the variable focal length lens cannot sufficiently cover such uneven shape of the object and the resulting image may be partly out of focus.

The present invention has been made in view of these circumstances. An object of the present invention is to achieve imaging of an object in a short time by using a non-scanning type imaging system, while suppressing blurring in the resulting image by appropriately handing undulations or bumps on the surface of the object.

The inventors of the present invention have found, as a result of intensive studies, that the above object can be achieved by detecting variations in the surface level of an object and adjusting the position of the object in the focus direction based on the detected variations in such a manner that the surface level of the object becomes closer to the center of the variable focal length range of the variable focal length lens, and have completed the present invention.

That is, various aspects of the present invention include the following:

(1) An imaging system comprising: an image forming device comprising an optical system having a variable focal length lens capable of changing a focal length to an object within a predetermined range, the image forming device obtaining image information of the object with the focal length being changed by the variable focal length lens, and forming an all-focused image of the object; a sensor device that detects variations in the surface level of the object in a direction of focus; and a position adjustment device that adjusts the position of the object in the direction of focus in accordance with the surface level variations of the object detected by the sensor device, wherein the position adjustment device adjusts the position of the object in the direction of focus in a manner such that the surface level of the object becomes closer to the center of a variable focal length range of the variable focal length lens.

(2) The imaging system as set out in (1) above, wherein the sensor device detects that the surface level of the object has moved within the variable focal length range by a predetermined threshold from the center of the variable focal length range, and wherein the position adjustment device adjusts the position of the object in the direction of focus when the sensor device detects that the surface level of the object has moved by the predetermined threshold.

(3) The imaging system as set out in (2) above, wherein the predetermined threshold is set as distances away in opposite directions from the center of the variable focal length range.

(4) The imaging system as set out in any of (1) to (3) above, wherein the position adjustment device adjusts the position of the object in the direction of focus in a manner such that the surface level of the object agrees with the center of the variable focal length range.

(5) The imaging system as set out in any of (1) to (4) above, wherein the sensor device includes a laser light source that applies laser light to the object, and a photodiode that receives the laser light reflected from the object.

(6) The imaging system as set out in any of (1) to (5) above, wherein the position adjustment device includes a moving device that moves the position of the object in the direction of focus, and a position controller that controls the moving device so as to adjust the position of the object in the direction of focus.

(7) An imaging method comprising the steps of: obtaining image information of an object with a focal length to the object being changed by a variable focal length lens provided in an optical system, so as to form an all-focused image of the object; detecting variations in the surface level of the object in a direction of focus; and, in response to the variations in the surface level of the object, adjusting the position of the object in the direction of focus in a manner such that the surface level of the object becomes closer to the center of a variable focal length range of the variable focal length lens.

(8) The imaging method as set out in (7) above, wherein the position of the object in the direction of focus is adjusted when the surface level of the object moves within the variable focal length range by a predetermined threshold from the center of the variable focal length range.

(9) The imaging method as set out in (8) above, wherein the predetermined threshold is set as distances away in opposite directions from the center of the variable focal length range.

(10) The imaging method as set out in any of (7) to (9) above, wherein the position of the object in the direction of focus is adjusted in a manner such that the surface level of the object agrees with the center of the variable focal length range.

DETAILED DESCRIPTION

Figure 1:
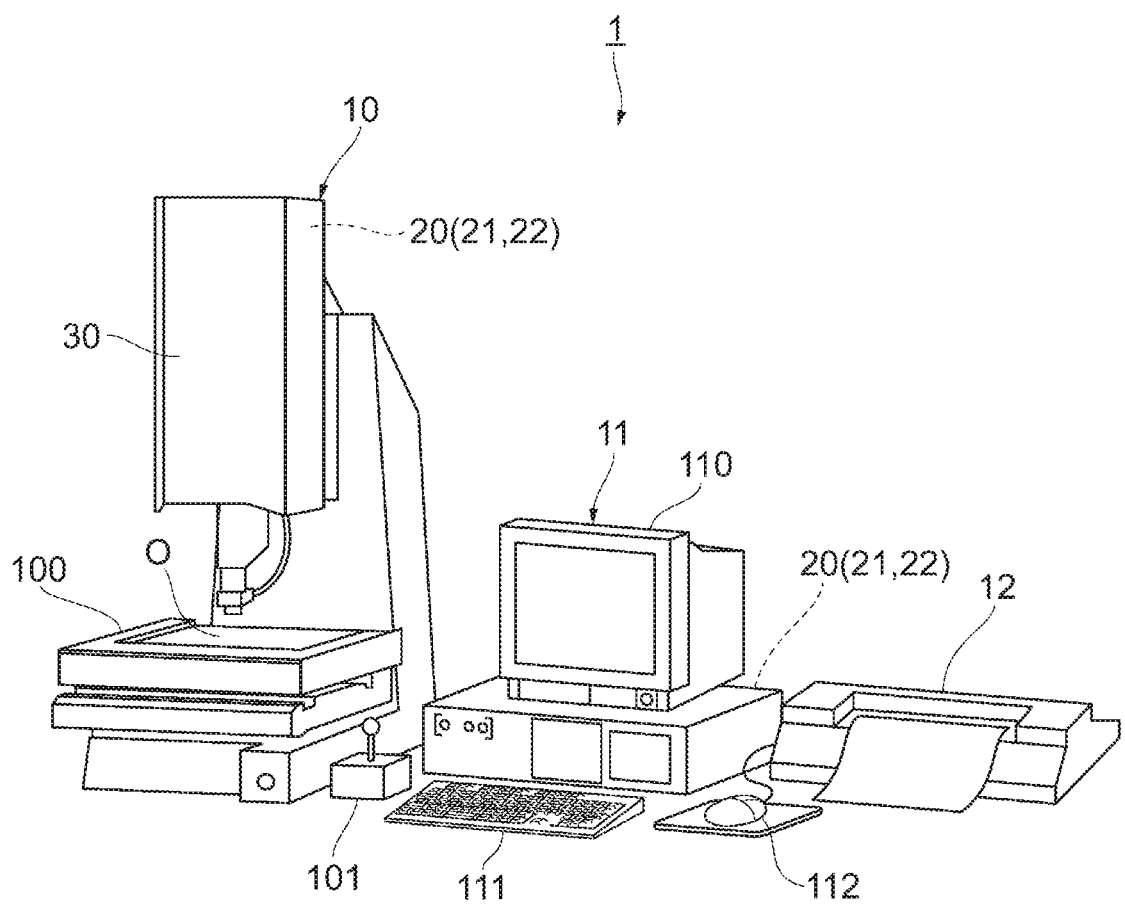
FIG. 1 is a perspective view of an imaging system, showing an example of the configuration of an imaging system.

Hereinafter, preferred embodiments of the present invention will be described with reference to the attached drawings. In the description set forth below, the same elements will be given the same reference numerals and any repetitive explanation will be omitted. Unless otherwise specified, the positional relationships, such as up-and-down and right-and-left relationships, are based on those shown in the drawings. The various dimensional ratios shown in the drawings are not limited to those in the drawings. In addition, the embodiments set forth below are just examples for describing the present invention and the present invention is not limited to the described embodiments.

Imaging System

Figure 2:
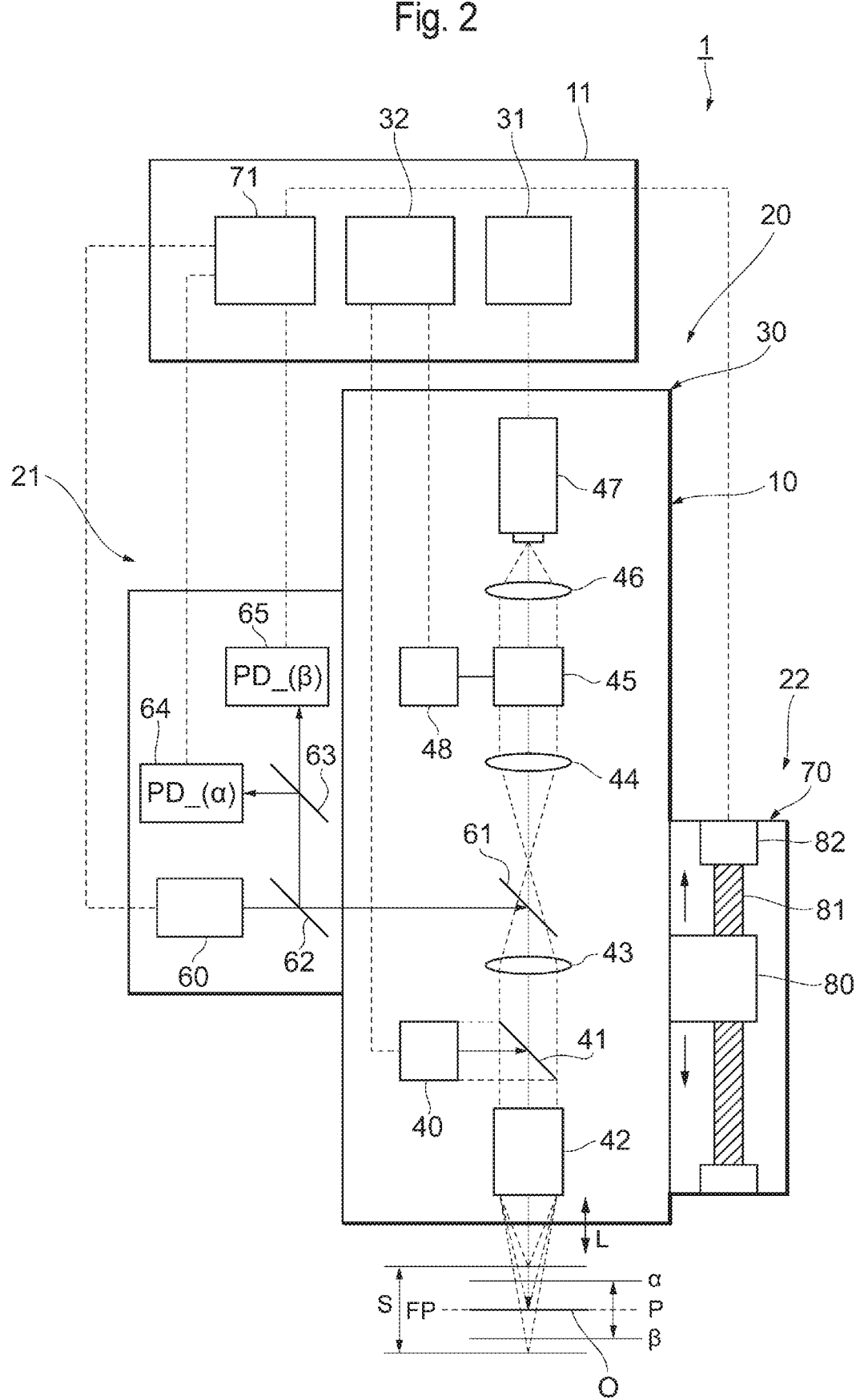
FIG. 2 is a schematic illustration showing an example of the internal configuration of an imaging system.

FIG. 1 is a perspective view of an imaging system 1 according to the present embodiment, and shows an example of the configuration of the imaging system 1. The imaging system 1 includes, for example, a measuring machine 10, a computer 11, and a printer 12. An image forming device 20 according to the present invention, a sensor device 21 and a position adjustment device 22 are incorporated in the measuring machine 10 and the computer 11. FIG. 2 is a schematic illustration showing an example of the internal configuration of the imaging system 1.

As shown in FIG. 2, the image forming device 20 includes, for example, an optical system 30 of a microscope, an image processor 31 and an optical system controller 32.

The optical system 30 is mounted on the measuring machine 10. The optical system 30 is an infinity-corrected optical system which includes, for example, a light source 40, a beam splitter 41, an objective lens 42, an imaging lens 43, a collimator lens 44, a variable focal length lens 45, an imaging lens 46, and a camera 47. The light output from the light source 40 is reflected on the beam splitter 41, passes through the objective lens 42, and is then applied to the surface of an object O. The light is then reflected on the surface of the object O, passes through the objective lens 42, the imaging lens 43, the collimator lens 44, the variable focal length lens 45 and the imaging lens 46, and is then input into the camera 47. The image data obtained in the camera 47 is output to the image processor 31.

The variable focal length lens 45 is, for example, a tunable acoustic gradient index of refraction lens. In response to control signals from a lens controller 48, the variable focal length lens 45 is able to change the focal length relative to the object O in the optical system 30 within a predetermined range S of variation (see FIG. 2). Such variable focal length range S is determined based on, for example, the magnification at which the object is observed with the objective lens 42 and the size of the optical system 30. The variable focal length lens 45, upon receipt of periodic sinusoidal-wave control signals from the lens controller 48, can continuously change the focal length at the same cycle as that of the received control signals, e.g., at a frequency of hundreds of kilohertz. The surface of the object O is aligned at around the center P of the variable focal length range S.

The image processor 31 is mounted on, for example, the computer 11. The image processor 31 forms an all-focused image of the object O by, for example, processing the image data of the object O, which has been obtained by the camera 47 while changing the focal length with the variable focal length lens 45. The process of forming such an all-focused image will be described later.

The optical system controller 32 is mounted on, for example, the computer 11. The optical system controller 32 controls the light source 40 and the lens controller 48.

The sensor device 21 is mounted on the measuring machine 10. The sensor device 21 includes, for example, a laser light source 60, beam splitters 61, 62 and 63, and photodiodes 64 and 65. The beam splitter 61 is disposed between the imaging lens 43 and the collimator lens 44 in the optical system 30. The beam splitter 62 is disposed between the laser light source 60 and the beam splitter 61. The beam splitter 63 is disposed between the beam splitter 62 and the photodiodes 64 and 65. The laser light output from the laser light source 60 is reflected on the beam splitter 61, passes through the imaging lens 43 and the objective lens 42, and enters the surface of the object O. The laser light is then reflected on the surface of the object O, passes through the objective lens 42, the imaging lens 43 and the beam splitters 61, 62 and 63, and is then input to each of the photodiodes 64 and 65.

Figure 3:
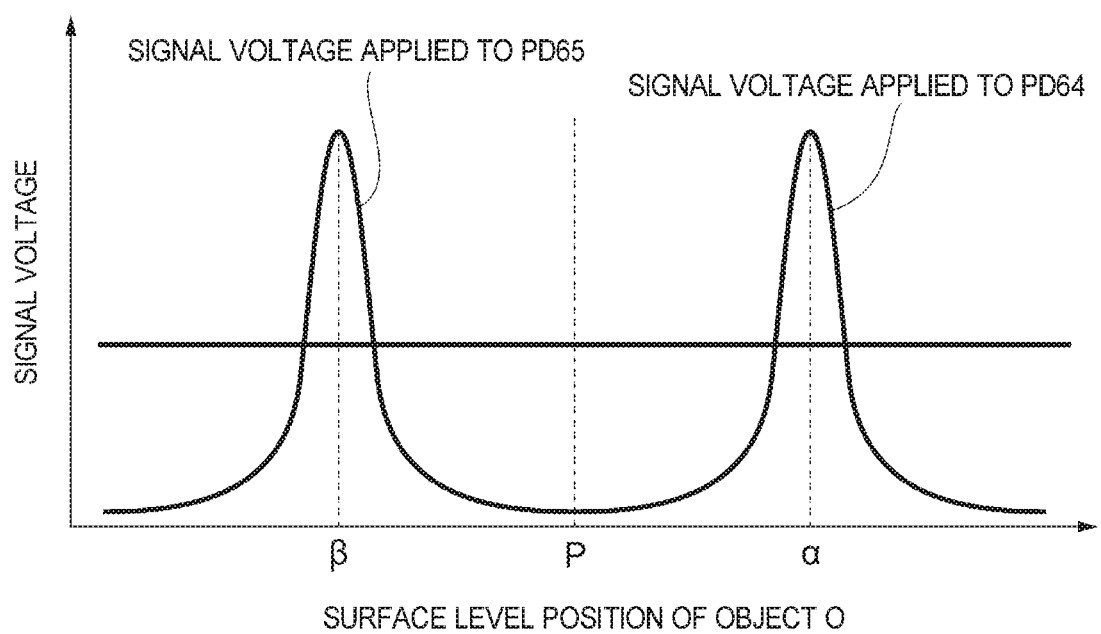
FIG. 3 is a graph showing signal voltage applied to photodiodes.

The photodiode 64 is arranged so that the intensity (signal voltage) of an input signal of the laser light has a maximum value (see FIG. 3) when the surface level of the object O is at a position α shown in FIG. 2 (i.e., when the surface level moves up by a distance of a from the center P of the variable focal length range S). Meanwhile, the photodiode 65 is arranged so that the intensity (signal voltage) of an input signal of the laser light has a maximum value (see FIG. 3) when the surface level of the object O is at a position β shown in FIG. 2 (i.e., when the surface level moves down by a distance of β from the center P of the variable focal length range S). With such arrangement, the sensor device 21 can detect the varying surface level of the object O in the direction of focus L (i.e., the vertical direction in FIG. 2) due to an undulation or bump of the object O, by monitoring signals of the laser light input to the photodiodes 64 and 65. The positional information on the object O obtained at the photodiodes 64 and 65 is output to, for example, a position controller 71 shown in FIG. 2, which will be described later. Such position controller 71 may also control the laser light source 60. In the present embodiment, the respective values of α, β and S are set, for example, to satisfy α=β<S/2.

The position adjustment device 22 includes, for example, a moving device 70 and the position controller 71, as shown in FIG. 2. The moving device 70 is mounted on, for example, the measuring machine 10. For example, the moving device 70 moves the optical system 30 as a whole in the direction of focus L. The moving device 70 is comprised of, for example, a slider 80 that holds a casing for the optical system 30, a ball screw 81 that rotates to move the slider 80 in the direction of focus L, and a motor 82 that rotates the ball screw 81. With this configuration, the moving device 70 can move the optical system 30 so that the position of the object O in the direction of focus L can be moved accordingly.

The position controller 71 is mounted on the computer 11. When the sensor device 21, which is monitoring the varying surface level of the object O, detects that the surface level of the object O has moved by a distance of α or β, which is a threshold, from the center P of the variable focal length range S, the moving device 70 is activated so as to adjust the position of the object O in the direction of focus L so that the surface level of the object O returns to the center P of the variable focal length range S.

As illustrated in FIG. 1, the measuring machine 10 includes, for example, an X-Y stage (horizontal movement device) 100 on which the object O is placed and which moves the object O in the X-Y direction (horizontal direction), and a joystick 101 for manually moving the object O in the X-Y direction or adjusting the position of the optical system 30 in the Z-direction. The X-Y stage 100 may be equipped with an elevating device for moving the object O up and down.

The computer 11 can implement a variety of controls by executing various programs stored in a storage unit with the CPU. The computer 11 controls, for example, the operation of the image forming device 20, the sensor device 21 and the position adjustment device 22. The computer 11 includes at least the above-described image processor 31, optical system controller 32 and position controller 71. The computer 11 is provided with, for example, a display 110, a keyboard 111, and a mouse 112.

Imaging Method

An example of the imaging process performed using the above-described imaging system 1 will now be described.

Figure 4:
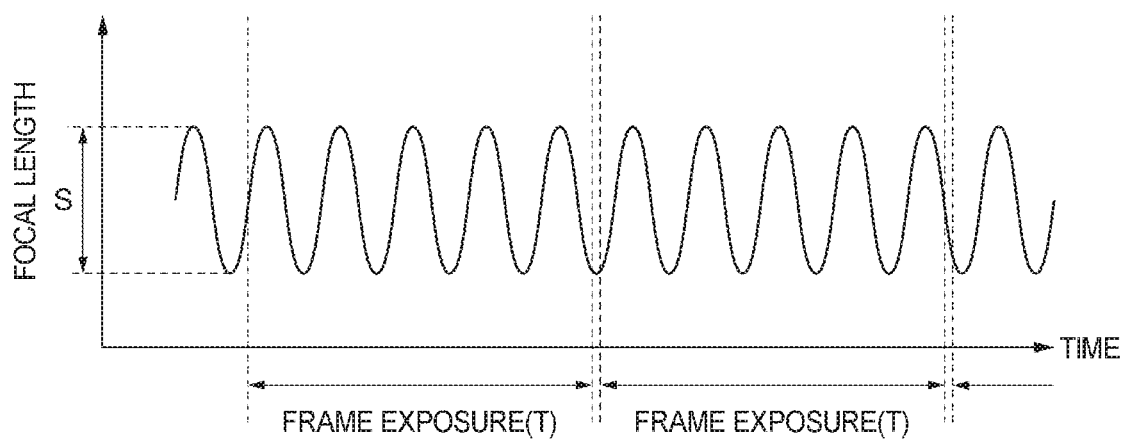
FIG. 4 is a graph showing a waveform variation of a focal length.

First, the optical system 30 applies light from the light source 40 to the object O. Here, with the aid of the variable focal length lens 45, the focal length to the object O is changed in a sinusoidal waveform at a frequency of tens of kilohertz, which is hundreds to thousands of times greater than the frame rate of the camera 47, as illustrated in FIG. 4. Such sinusoidal waveform variations of the focal length occur in the variable focal length range S. During exposure, the camera 47 continuously obtains image information of the object O, for which the focal length is varying (i.e., the focal position is moving). The obtained image information is output to the image processor 31, which, in turn, integrates a series of pieces of image information of the object O, which have been obtained during a specified period (e.g., frame exposure time T) for a single image, so as to thereby generate an integral image. The thus obtained integral image is a blurred image including each piece of information obtained during the exposure throughout the focus range (variable focal length range) S. An all-focused image of the object O is formed by removing unwanted pieces of image information from the integral image. Such removal of unwanted image information from the integral image may be performed by, for example, processing the integral image through computations, or by using an optical filter so that the light applied to obtain the integral image is filtered in advance.

For example, when unwanted image information is removed from the integral image by way of image processing, the integral image is deconvolved by, for example, using a predetermined point spread function (PSF) corresponding to the focus range S of the integral image. A point spread function (PSF) characterizes a blur circle, i.e., a circular image of a point light source at a given distance from an imaging system as a function of a radius r of the blur circle and the focus position FP. A point spread function may be determined experimentally for an imaging system (e.g., the imaging system 1), or it may be estimated using point spread functions modeled on functions such as a pill box or a Gaussian curve, or using basic diffraction principles, e.g., Fourier optics, according to known methods. Such point spread functions at various focus distances within the focus range S may be weighted according to their expected exposure contributions or applicability. For example, when the focus distance moves during an exposure, each focus distance will contribute to an image exposure for a corresponding time period within that exposure, and a point spread function corresponding to that distance may be weighted accordingly. Such weighted point spread function contributions may be summed or integrated over an expected focus range S. Alternatively, when the focus distance change is a known function of time, such point spread function contributions may be integrated over a period of time corresponding to a sweep of the expected focus range S, analogous to the approach indicated below with reference to FIG. 2.

For an imaging system having a modulated focus position, an integrated point spread function h is expressed by:

$$h = \int_0^T P(FP(t))dt \qquad \text{Equation 1}$$

where P(FP(t)) is a point spread function and FP(t) is a time-dependent focus position. A focus position in the imaging system 1 may be modulated as a function of time t over the total integration time T, which corresponds to the time of image exposure or integration of the integral image.

Deconvolution of the integral image may be understood as an inverse operation that deconvolves a high depth of field image exposed over a range of focus positions having respective durations in the exposure, from an integrated point spread function h, which in some applications may be referred to as a "blur function." The integral image may be represented as a two-dimensional function g(x,y), which is a convolution of an all-focused image f(x,y) (corresponding to an image array with dimensions m x n) with the integrated point spread function h, as follows:

$$g(x,y) = f*h = \Sigma_m \Sigma_n f(m,n)h(x-m,y-n) \qquad \text{Equation 2}$$

In the frequency domain, this convolution may be represented by the product of F and H, which are the Fourier transforms of f and h, respectively:

$$G = F \cdot H \qquad \text{Equation 3}$$

The Fourier transforms of f and h may be determined efficiently using a fast Fourier transform (FFT) algorithm. The all-focused image (in the frequency domain) may be determined by processing the image G (i.e., multiplying it) by an inverse of H, denoted here as $H_r$. The inverse $H_r$ may be computed by several known methods. For example, a simple pseudo inverse of H may be determined by the equation:

$$H_r = \frac{H^*}{|H|^2 + k} \qquad \text{式 4}$$

where H* is the complex conjugate of H, and k is a real number chosen empirically based on characteristics of the imaging system 1. In one exemplary embodiment, k is 0.0001. Finally, the all-focused image f may be computed as:

$$f(x, y) = g * h_r = \mathcal{F}^{-1}(G \cdot H_r) = \mathcal{F}^{-1}\left\{G \cdot \frac{H^*}{|H|^2 + k}\right\} \qquad \text{式 5}$$

A more robust alternative to the pseudo inverse may be computed according to a Wiener Deconvolution or a Lucy-Richardson iterative algorithm, which are described in Digital Image Processing by Kenneth R. Castleman (Prentice-Hall, Inc., 1996). Additionally, processing of the image may include block-based denoising.

Figure 5:
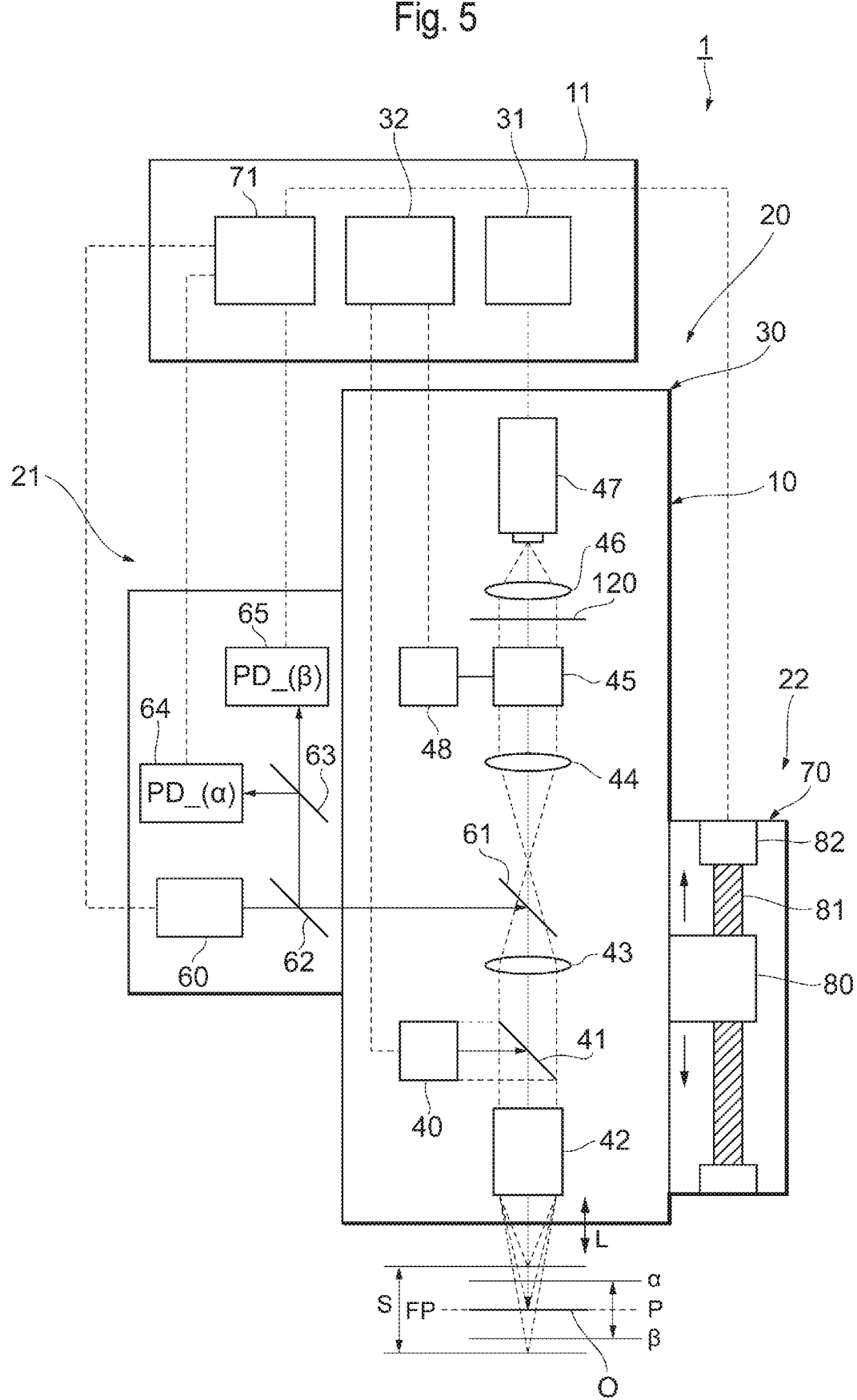
FIG. 5 is a schematic illustration showing an example of the internal configuration of an imaging system using an optical filter.

Next, the removal of unwanted image information from the integral image using an optical filter will be described. In this case, as shown in FIG. 5, deconvolution is optically performed according to basic methods of Fourier optics using a passive optical filter 120, which is placed in a Fourier plane of the imaging system for all-focused images, so that a relatively clear all-focused image can be provided in real time.

It should be noted that the method for removing unwanted image information from the integral image is not limited to those described above, and any known method can be used.

A single all-focused image is generated from the integral image in the manner described above, and an all-focused image that covers the object O as a whole can be generated by continuously performing the above operation while, for example, horizontally moving the object O with the X-Y stage 100.

As already described above, during the time when light is applied from the light source 40 to the object O and the camera 47 obtains image information from the light reflected from the object O, the sensor device 21 operates to emit laser light from the laser light source 60. The laser light is applied to the surface of the object O and the reflected light therefrom is input to the photodiodes 64 and 65. The input signals to the photodiodes 64 and 65 are then output to, and monitored by, the position controller 71 of the position adjustment device 22. When, for example, the object O moves in the horizontal direction and when, due to a large undulation or bump on the surface of the object O, an intensity of light detected by the photodiode 64 reaches a maximum, i.e., the surface level of the object O is at a distance α from the center P of the variable focal length range S, or an intensity of light detected by the photodiode 65 reaches a maximum, i.e., the surface level of the object O is at a distance β from the center P of the variable focal length range S, then an auxiliary function for adjusting the position of the object O in the focus direction L starts.

Figure 6:
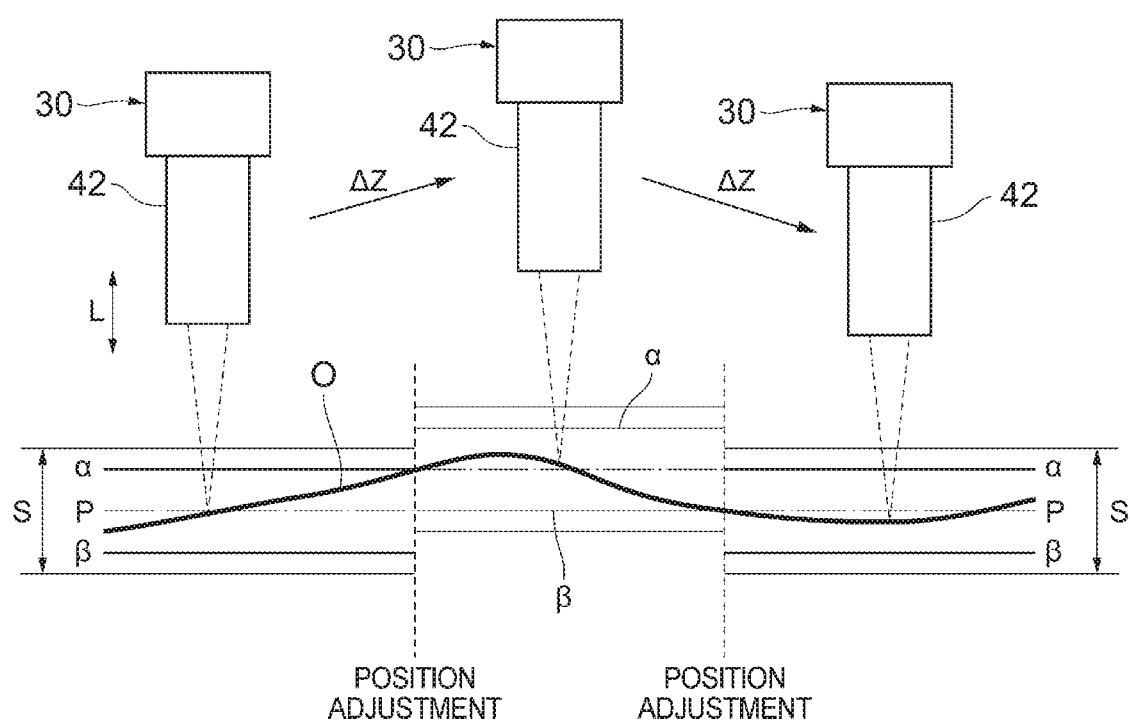
FIG. 6 is an illustration explaining the change of the position of an object in a focus direction in an example.

More specifically, as shown in FIG. 6, when the surface level of the object O is at a distance α from the center P, the moving device 70 operates so as to move the optical system 30 away from the object O so that the position of the object O in the focus direction L is adjusted in a manner such that the surface level of the object O accordingly becomes closer to the center P of the variable focal length range S. For example, the optical system 30 is moved up by α (i.e., ΔZ), so that the surface level of the object O agrees with the center P of the variable focal length range S.

On the other hand, when the surface level of the object O is at a distance β from the center P, the moving device 70 operates so as to move the optical system 30 closer to the object O so that the position of the object O in the focus direction L is adjusted in a manner such that the surface level of the object O accordingly becomes closer to the center P of the variable focal length range S. For example, the optical system 30 is moved down by β (i.e., ΔZ), so that the surface level of the object O agrees with the center P of the variable focal length range S. After the completion of the position adjustment of the object O, the auxiliary function for adjusting the position of the object O in the focal direction L is stopped.

The camera 47 continues to obtain image information and, each and every time when the surface level of the object O moves by a distance α or β from the center P of the variable focal length range S, the auxiliary function starts and the position of the object O in the focus direction L is adjusted by the position adjustment device 22. Such position adjustment of the object O in the focus direction L is not performed as long as no large undulations or bumps exist on the surface of the object O and the surface level of the object O is accordingly within a distance α or β from the center P. As described above, the position of the object O in the focus direction L is adjusted in a manner such that the surface level of the object O always falls within the variable focal length range S.

According to the present embodiment, in response to variations in the surface level of the object O in the focus direction L, which are detected by the sensor device 21, the position of the object O in the focus direction L is adjusted by the position adjustment device 22 in such a manner as to make the surface level of the object O closer to the center P of the variable focal length range S, and accordingly, the surface of the object O is always placed within the variable focal length range S even if the surface of the object O includes undulations or bumps beyond the variable focal length range S. As a result, the inclusion of blurring in all-focused images can be suppressed. In other words, imaging of an object can be achieved in a short time using the non-scanning type imaging system 1 and, at the same time, any blurring in the resulting image can be suppressed as a result of appropriately handling variations in the surface level of the object O. In addition, the level of accuracy required in such position adjustment by the position adjustment device 22 is not so high because what is needed in such position adjustment is to just place the surface level of the object O within the variable focal length range S, and this can lead to cost reduction of the imaging system 1.

Since the position adjustment device 22 adjusts the position of the object O in the focus direction L when the sensor device 21 detects that the surface level of the object O has moved by a predetermined threshold, i.e., a distance α or β, the frequency of operation of the position adjustment device 22 can be reduced, resulting in a decreased load for the position adjustment device 22.

Since the predetermined thresholds α and β are set as distances away in opposite directions from the center P of the variable focal length range S, variations in the surface level of the object O can be appropriately handled, regardless of whether the surface level has moved up or down.

Since the position adjustment device 22 adjusts the position of the object O in the focus direction L in such a manner that the surface level of the object O agrees with the center P of the variable focal length range S, the frequency of the surface level of the object O reaching the threshold can be minimized.

The sensor device 21 has the laser light source 60 for applying laser light to the object O and the photodiodes 64 and 65 for receiving the laser light reflected from the object O, and, with this configuration, the sensor device 21 can detect variations in the surface level of the object O in a suitable manner.

The position adjustment device 22 has the moving device 70 for moving the position of the object O in the focus direction L and the position controller 71 for controlling the moving device 70 to adjust the position of the object O in the focus direction L, and, with this configuration, the position adjustment device 22 can implement the position adjustment of the object O in the focus direction L in a suitable manner.

Preferred embodiments of the present invention have been described above with reference to the attached drawings; however, the present invention is not limited to the described examples. A person skilled in the art could obviously think of various modifications and alterations without departing from the idea specified in the scope of the claims and it should be appreciated that such modifications and alterations would obviously be encompassed within the technical scope of the present invention.

For example, the above-described embodiment describes an example in which distances α and β falling within the variable focal length range S are set as thresholds for the varying surface level of the object O, but the present invention is not limited thereto. The limit values (upper and lower limits) of the variable focal length range S may be set as such thresholds, or a distance out of the variable focal length range S may be set as a threshold. Further, only one of α and β may be set as a threshold. The values of the thresholds α and β may be the same or different. In addition, the position adjustment of the object O in the focus direction L may be performed on an as-needed basis, without setting thresholds.

The position of the object O in the focus direction L does not necessarily need to be adjusted by a distance corresponding to the thresholds α and β, and the position may be adjusted by a distance smaller than the thresholds α and β. Furthermore, although the position of the object O in the focus direction L is adjusted by moving the optical system 30 with the moving device 70 in the above-described embodiment, adjustment may be performed by moving the object O or by moving both the optical system 30 and the object O.

The configuration of the imaging system 1, i.e., the respective configurations of the image forming device 20, the sensor device 21, the position adjustment device 22, etc., in the above-described embodiment are not limited to those described above, and different configurations may be adopted. Moreover, the configurations of the measuring machine 10, the computer 11, etc., are also not limited to those described above.

The present invention is useful in achieving imaging of an object in a short time using a non-scanning type imaging system and, at the same time, appropriately handling undulations or bumps on the surface of the object so as to suppress blurring in the resulting image.

According to the present invention, imaging of an object is achieved in a short time by using a non-scanning type imaging system, while suppressing blurring which would otherwise be included in the resulting image due to undulations or bumps on the surface of the object.

What is claimed is:

1. An imaging system comprising:
an image forming device comprising an optical system having a variable focal length lens capable of changing a focal length to an object within a predetermined range, the image forming device obtaining image information of the object with the focal length being changed by the variable focal length lens, and forming an all-focused image of the object by removing unwanted image information from an integral image using a predetermined, time-dependent point spread function;
a sensor that detects variations in a surface level of the object in a direction of focus; and
a position adjuster that adjusts a position of the object in the direction of focus in accordance with the surface level variations of the object detected by the sensor, wherein:
the position adjuster is configured to adjust the position of the object in the direction of focus in a manner such that the surface level of the object becomes closer to the center of a variable focal length range of the variable focal length lens,
the sensor is configured to detect whether the surface level of the object has moved within the variable focal length range by a predetermined threshold from the center of the variable focal length range, and
the position adjuster is further configured to
adjust the position of the object in the direction of focus when the sensor detects that the surface level of the object has moved by the predetermined threshold, and
maintain the optical system in a fixed position relative to the stage on which the object is placed, when the sensor detects that the surface level of the object has moved by an amount not exceeding the predetermined threshold.

2. The imaging system according to claim 1, wherein the predetermined threshold is set as distances away in opposite directions from the center of the variable focal length range.

3. The imaging system according to claim 2, wherein the position adjuster adjusts the position of the object in the direction of focus in a manner such that the surface level of the object agrees with the center of the variable focal length range.

4. The imaging system according to claim 2, wherein the sensor includes a laser light source that applies laser light to the object and a photodiode that receives the laser light reflected from the object.

5. The imaging system according to claim 2, wherein the position adjuster includes a drive assembly that moves the position of the object in the direction of focus, and a position controller that controls the drive assembly so as to adjust the position of the object in the direction of focus.

6. The imaging system according to claim 1, wherein the position adjuster adjusts the position of the object in the direction of focus in a manner such that the surface level of the object agrees with the center of the variable focal length range.

7. The imaging system according to claim 1, wherein the sensor includes a laser light source that applies laser light to the object and a photodiode that receives the laser light reflected from the object.

8. The imaging system according to claim 1, wherein the position adjuster includes a drive assembly that moves the position of the object in the direction of focus, and a position controller that controls the drive assembly so as to adjust the position of the object in the direction of focus.

9. The imaging system according to claim 1, wherein the position adjuster adjusts the position of the object in the direction of focus in a manner such that the surface level of the object agrees with the center of the variable focal length range.

10. The imaging system according to claim 1, wherein the sensor includes a laser light source that applies laser light to the object and a photodiode that receives the laser light reflected from the object.

11. The imaging system according to claim 1, wherein the position adjuster includes a drive assembly that moves the position of the object in the direction of focus, and a position controller that controls the drive assembly so as to adjust the position of the object in the direction of focus.

12. An imaging method comprising:
obtaining image information of an object with a focal length to the object being changed by using a variable focal length lens provided in an optical system, so as to form an all-focused image of the object by removing unwanted image information from an integral image using a predetermined, time-dependent point spread function;
detecting variations in a surface level of the object in a direction of focus; and
in response to the variations in the surface level of the object, adjusting a position of the object in the direction of focus in a manner such that the surface level of the object becomes closer to the center of a variable focal length range of the variable focal length lens, wherein:
the adjusting the position of the object comprises adjusting the position of the object in the direction of focus when the surface level of the object moves within the variable focal length range by a predetermined threshold from the center of the variable focal length range, and
the optical system is maintained in a fixed position relative to the stage on which the object is placed when the surface level of the object moves by an amount not exceeding the predetermined threshold.

13. The imaging method according to claim 12, wherein the predetermined threshold is set as distances away in opposite directions from the center of the variable focal length range.

14. The imaging method according to claim 13, wherein the position of the object in the direction of focus is adjusted in a manner such that the surface level of the object agrees with the center of the variable focal length range.

15. The imaging method according to claim 12, wherein the position of the object in the direction of focus is adjusted in a manner such that the surface level of the object agrees with the center of the variable focal length range.

16. The imaging method according to claim 12, wherein the position of the object in the direction of focus is adjusted in a manner such that the surface level of the object agrees with the center of the variable focal length range.

* * * * *